Oct. 9, 1945. J. C. STAFFORD 2,386,639
HIGH SPEED GRINDING SPINDLE
Filed Jan. 5, 1943
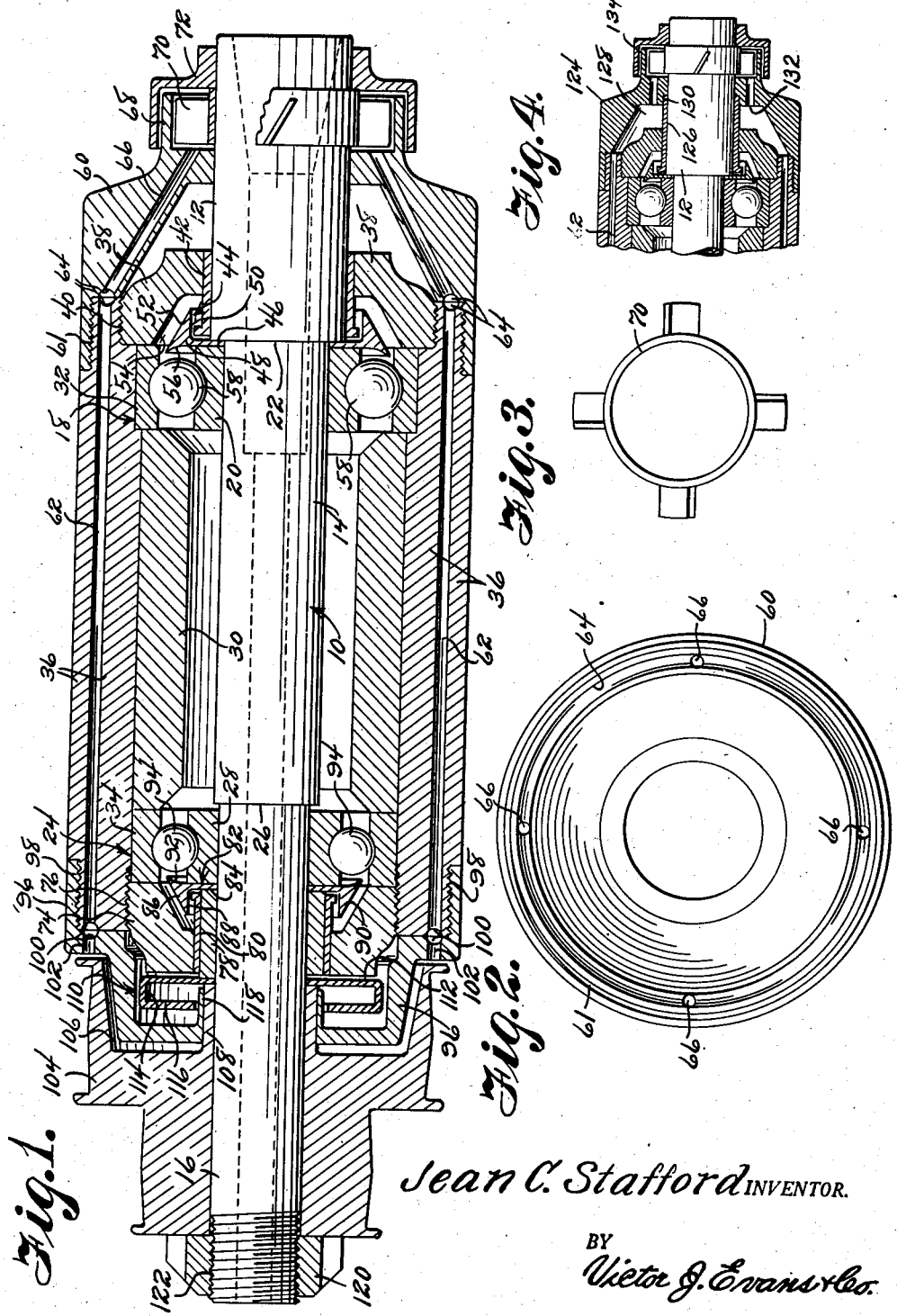
Jean C. Stafford INVENTOR.
BY
Victor J. Evans & Co.
ATTORNEYS Patented Oct. 9, 1945

2,386,639

UNITED STATES PATENT OFFICE 2,386,639

HIGH-SPEED GRINDING SPINDLE

Jean C. Stafford, Dayton, Ohio

Application January 5, 1943, Serial No. 471,337

2 Claims. (Cl. 308—76)

My invention relates to rotary grinders and the like, and has among its objects and advantages the provision of an improved high speed grinding spindle.

In the accompanying drawing:

Figure 1 is a longitudinal sectional view of the spindle with the central shaft thereof illustrated in elevation.

Figure 2 is an end view of a portion of the spindle structure.

Figure 3 is a face view of an air circulating fan, and

Figure 4 is a sectional view of a modified construction.

In the embodiment of the invention selected for illustration, I make use of a spindle shaft 10 shaped with progressively smaller diameters 12, 14 and 16. Upon the diameter 14 of the shaft 10 is mounted a roller bearing 18, which bearing includes a race 20 mounted on the diameter 14 closely adjacent the shoulder 22. A second roller bearing 24 is mounted on the diameter 16 but spaced from the shoulder 26. The inner race 28 of the bearing 24 fits on the diameter 16. A bushing 30 is interposed between the bearings 18 and 24 and has its ends respectively engaging the outer races 32 and 34 of the roller bearings 18 and 24, respectively.

A tubular housing 36 encloses the two roller bearings and the bushing 30, the latter having a sliding fit in the housing. A bearing jam nut 38 is threadedly connected at 40 with one end of the housing 36 and is provided with a brass lip bushing 42 having a push fit with respect to the jam nut. This jam nut engages the outer end of the bearing race 32. Between the inner bearing race 20 and the shoulder 22 is clamped a centrifugal dust guard and grease retainer 44. This guard and retainer includes a thin wall 46 bored to receive the diameter 14 and provided with a flange 48 defining an annular recess 50 housing the flanged end of the lip bushing 42.

The flange 48 is provided with an outer annular face 52 tapering from the wall 46 and spaced from the correspondingly contoured recess 54 in the adjacent end of the jam nut 38. A slightly concaved lip 56 diverges from the wall 46 in the direction of the bearing rollers 58 but spaced therefrom.

A cap 60 is threadedly connected at 61 with the front or that end of the housing 36 facing the grinding wheel, not shown. Air ports 62 extend longitudinally through the wall of the housing 36 and have communication with annular recesses 64 in the front cap 60 and the adjacent end of the housing 36 coacting to provide an annular port having communication with ports 66 in the cap 60 and converging axially of the shaft 10. The outer end of the cap 60 is provided with an annular flange 68 arranged coaxially of the shaft 10 and constituting a housing for a propeller fan 70 having a push fit on the shaft 10. A dust cap 72 also has a push fit on the shaft 10 and spaced from the end and outer peripheral face of the flange 68 for the passage of air circulated through the ports 62 and 66.

The outer bearing race 34 of the bearing 24 is clamped against the adjacent end of the bushing 30 by a jam nut 74 threadedly connected at 76 with the housing 36. A thrust bushing 78 has a sliding fit on the diameter 16. A brass lip bushing 80 has a sliding fit on the thrust bushing 78 but a push fit in the jam nut 74.

Between the inner bearing race 28 and the thrust bushing 78 is interposed a centrifugal dust guard and grease retainer 82 having a sliding fit on the shaft 10. This guard and retainer includes a thin wall 84 clamped between the thrust bushing 78 and the bearing race 28, which wall carries an annular flange 86 defining an annular recess 88 loosely housing the flanged end of the lip bushing 80. The flange 86 includes an outer face 90 tapering away from the wall 84. A slightly concaved flange 92 is carried by the wall 84 and diverges in the direction of the bearing rollers 94 but spaced therefrom.

With the exception of diameters, the guards and retainers 44 and 82 are identical, the guard and retainer 44 tapering toward the axis of the shaft 10 outwardly from the bearing 18, while the guard and retainer 82 tapers outwardly from the bearing 24.

A second housing cap 96 is threadedly connected at 98 with the rear or that end of the housing 36 facing the pulley 104. This cap and the adjacent end of the housing 36 are provided with annular recesses 100 defining an annular port having communication with the atmosphere through the medium of openings 102 in the housing 36.

Upon the shaft 10 is mounted a pulley 104 having a cavity 106 to provide accommodation for the cap 96. The pulley is spaced from the cap 96 and includes a sleeve 108 cooperating with the thrust bushing 78 to support a brass dirt collector 110 having a sliding fit on the shaft 10. The collector 110 includes a thin wall 112 clamped between the sleeve 108 and the thrust bushing 78. This wall includes an annular flange 114 arranged coaxially with the shaft 10 and provided with an inturned flange 116 spaced from the wall 112 and from the sleeve part 118 of the cap 96.

A lock nut 120 is threadedly connected with the shaft 10 at 122 and abuts the pulley 104 so that the latter may be adjusted to fixedly relate the collector 110 with the shaft 10 and between the pulley and the thrust bushing 78.

My invention is particularly well suited for use in connection with small grinding wheels. In devices now available, the spindle housings are objectionably large in diameters so as to constitute obstructions when used in connection with relatively small diameter wheels. The lubrication systems are ineffectual in that dust and dirt find easy entrance into the bearings and relatively movable parts. Operating speeds are much too slow in standard grinding machines for operating small diameter wheels.

My invention incorporates roller bearings and is so designed that play and end thrust may be eliminated to the end that the grinding spindle may be employed in position work. The major difficulty in connection with position bearings, particularly of the ball type, resides in the rapid wearing action of abrasive dirt and grit. A small particle of foreign material, when introduced into a ball race may destroy the bearing in a few seconds of time. Such grit also includes magnetized steel grindings that adhere to any magnetic material in their vicinity.

The atmosphere constitutes a vehicle for the transmission of dirt and grit. The atmosphere in the presence of grinding and wheel truing operations is loaded with such minute particles, which can and do enter into the small clearance spaces between the rotating spindle shaft and its component parts. To overcome these difficulties, my invention operates to cause a current of air to flow outwardly from within the spindle assembly at the spindle nose where dirt ordinarily enters. This current of air is supplied through the ports in the end caps and the housing surrounding the spindle shaft, but separated entirely from the bearing chamber. This current of air is produced by the fan 70 which is attached to the spindle shaft and rotates therewith at spindle shaft speed.

The pulley 104 is located close to the rear dust cover 96, so that centrifugal forces at this point tend to catch and throw any dust that might assemble thereabout. Should any magnetized particles adhere to the device through magnetism, or should grit tend to enter when the device is not in use or in storage, such particles are prevented from entering the bearings by reason of the centrifugal collector 110.

In connection with lubrication, a large part of the dirt and dust that ordinarily gives trouble in high speed bearings is deposited in the bearing oil stream by the oiler from the spout of the oil can. Most spindles now in use are lubricated in this manner, and when light oil is used, it must be frequently replaced.

Sealed lubricant retaining bearings make use of packings, which are objectionable sources of undesirable friction at high speeds. In the instant case, oil seals of this type are eliminated. All fits are free, there being a definite space between the spindle shaft and its surrounding components. Nothing is theoretically a metallic contact with the spindle shaft except the inner ball races, which are push fitted to the shaft, and the end thrust adjustment is applied through the medium of the cone pulley 104 threaded to the spindle shaft and anchored by the lock nut 120.

Ordinarily, in such loose fitting assemblies, lubricant would quickly escape. To prevent such escape, centrifugal forces are utilized through the instrumentalities of the guards and retainers 44 and 82, which constitute rotating baffle means revolving at the same rate of speed as the spindle shaft 10. These two members are so shaped that each includes an angular and circular lip on one side which extends into and hangs over the ball elements within its respective roller bearing. This construction continually collects lubricant attempting to escape, throwing it back into the bearings and then returning it to the oil reservoir. The opposite sides of the rotating members 44 and 82 consist of circular roofs or eaves, overhanging lipped bushings which surround the spindle shaft at these points and are fixedly related to the bearing confining jam nuts 38 and 74. The two members capture any drippings of oil that might adhere to the parts when the device is not in motion, and convey the accumulation to a point in the assembly away from any opening around the spindle shaft through which it might otherwise escape to the outside atmosphere, redepositing the oil in the bearings and the oil reservoir when the device is again set in motion.

Grease is preferably employed in contradistinction to free flowing oil. Lubrication begins, when using the device first through grease adhering to the bearings when last used, and secondly the lubrication flow is continued when a slight degree of frictional heat is attained which softens and liquefies the grease to a point where ample lubrication is maintained at all times. The members 44 and 82 prevent the escape of lubricant and continually redeposits the lubricant within the ball races, where it is required.

Both the collector 110 and the dust guards and grease retainers 44 and 82 are of brass, or other non-magnetic metal, so that charged particles of steel grinding will not adhere thereto. At the front end of the spindle where the most dust tends to accumulate and enter a device of this nature, a column of air blows outwardly to prevent the entrance of dirt and grit at this point.

In Figure 4, the cap 124 and the bushing 126 are so shaped and dimensioned as to provide an air cavity 128 completely sealed from the spindle length 12, since the bushing is closely fitted in an annular recess 130 in the cap 124. Openings 132 are bored in the cap 124 to place the cavity 128 in communication with the fan housing 134, with the air passages 62 in the housing 36 communicating with the air cavity or chamber 128.

Without further elaboration, the foregoing will so fully explain my invention, that others may, by applying current knowledge, readily adapt the same for use under various conditions of service.

I claim:

1. In a high speed grinder, a stationary tubular housing, caps on the front and rear ends of the housing, a spindle extending axially through the housing and caps, the spindle being adapted to carry a grinding wheel on its front end, a pulley on the rear end of the spindle, axially spaced front and rear bearing units within the housing for rotatably supporting the spindle, a dirt collector surrounding the spindle within the rear cap, a fan housing carried by the front cap in surrounding relation to the front end of the spindle, the fan housing being provided at its rear side with air intake means and at its front side with air discharge means, the spindle housing being provided with longitudinal passages opening to the atmosphere at the rear end of the spindle housing and communicating at their front ends with the air intake means of the fan housing, and fan blades carried by the spindle for rotation thereby to cause air to flow through said passages to and through the fan housing at the front end of the spindle.

2. A high speed grinder such as claimed in claim 1, additionally comprising a dust cap mounted on the front end of the spindle and having an annular wall arranged in spaced surrounding relation to the corresponding wall of the fan housing.

JEAN C. STAFFORD.